Patented Apr. 18, 1950

2,504,680

UNITED STATES PATENT OFFICE 2,504,680

PREPARATION OF ALKOXY-SUBSTITUTED ALDEHYDES

William F. Gresham, Wilmington, Del., assignor to E. I. du Pont de Nemours & Company, Wilmington, Del., a corporation of Delaware No Drawing. Application May 1, 1946, Serial No. 666,517

2 Claims. (Cl. 260—602)

This invention relates to a process for the preparation of alkoxy-substituted aldehydes and their corresponding acids and esters and more particularly to the preparation of beta-alkoxy-substituted saturated aliphatic aldehydes from alpha-beta-unsaturated aldehydes and aliphatic alcohols and the conversion of the products to the corresponding acids and esters.

It is known that unsaturated aldehydes can be reacted with alcohols to form alkoxy-substituted saturated aldehydes. In U. S. Patent 1,902,070 of March 21, 1933, such a process is described using an acid catalyst at temperatures between 20 and 30° C. The reaction with such catalysts proceeds very slowly requiring in the order of 3 days at 30° C. and appreciable amounts of the reactants are converted to acetals which inordinately lowers the yield of desired product. As the alkoxy-substituted aldehydes are valuable intermediates for the preparation of a variety of organic compounds a process that would produce such aldehydes without appreciable quantities of by-products would considerably lower the cost of these basic products.

An object of the present invention is to provide an improved process for the preparation of alkoxy-substituted aliphatic aldehydes. A further object is to provide a process for the interaction of acrolein or alpha alkyl substituted acroleins with aliphatic monohydric alcohols to beta-alkoxy-substituted aldehydes without the formation of acetals. Yet another object is to provide valuable intermediates from the alcohols and acroleins and the conversion of the intermediates to their corresponding acids and esters. Other objects and advantages of the invention will hereinafter appear.

The above and other objects are realized in accord with the process of this invention by reacting an unsaturated aldehyde with a saturated aliphatic alcohol in the presence of a basic catalyst. Generically the invention is illustrated but not limited by Equation 1.

(1)
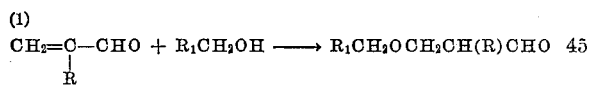

in which R and R₁ are hydrogen or an alkyl group such as methyl, ethyl, propyl, or butyl, R may also be an aryl group. More specifically the invention may be illustrated by the Equation 2 which characterizes the reaction of alpha methylacrolein with methanol to beta-methoxy isobutyraldehyde:

(2) $CH_2=C(CH_3)-CHO+CH_3OH \rightarrow$
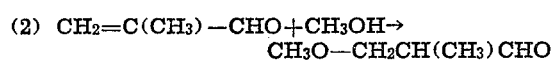

The process may be carried out by gradually adding a mixture of the unsaturated aldehyde in solution in an alcohol to an alcoholic solution of a base containing preferably a polymerization inhibitor to prevent the loss of aldehyde to polymers. The products of the reaction may be separated in any suitable manner, e. g. the desired product may be recovered after neutralizing the basic catalyst, flash distilling the products and recovering therefrom the saturated alkoxy-substituted aldehyde.

The examples illustrate preferred embodiments of the invention in which parts are by weight unless otherwise stated.

*Example 1.*—A mixture of 80 parts (1.14 moles) alpha methacrolein and 60 parts (1.875 moles) methanol was added over a one hour period to a solution of 160 parts (5 moles) dry methanol containing 0.6 part of sodium methoxide, 0.3 part of hydroquinone and 3.0 parts of water. During the period of addition the temperature was maintained between 0 and 15° C. At the end of this period of time the reaction product was neutralized with sulfuric acid, the neutralized product then subjected to rapid distillation under 100 mm. mercury pressure and beta-methoxy isobutyraldehyde which has a boiling point of 67° C. at 95 mm. pressure recovered. No acetals were formed. Based on the methacrolein charged, a 46.5% converison of beta-methoxy isobutyraldehyde is obtained in a yield of 79.8%.

Example 2

A

| | | |
|---|---|---|
| Methanol | g | 61 |
| Piperidine | cc | 0.5 |

B

| | | |
|---|---|---|
| Methanol | g | 20.5 |
| Acrolein | g | 35.7 |
| Hydroquinone | g | 0.1 |

Solution B was added to solution A with stirring at 0° C. during 4.6 hours. The mixture was stirred an additional 1.9 hours at 0–10° C., then neutralized with H₂SO₄ in MeOH, distilled at reduced pressure, giving crude CH₃OCH₂CH₂CHO in 60% conversion. The refined product boiled at 64°/100 mm. R. D./25°=1.3968. Methoxyl analysis=35.3 in one case, 36.9% in another which compares with 35.2% theoretical.

Piperidine was replaced by 5 g. sodium methoxide in several reactions. The results obtained were similar to the results of this example.

*Example 3.*—A solution of 100 g. (.97 M) of beta methoxy isobutyraldehyde in a solution of 100 g. glacial acetic acid containing 0.486 g. Cu(OAc)₂.4H₂O catalyst was processed 58 minuates with O₂ at the rate of 1 cu. ft./hr. 97 g. (84% conversion) of beta methoxy isobutyric acid BP₂₀ 110–112° was recovered.

The methyl ester of beta methoxy isobutyric acid thus prepared was esterified with methanol by processing in the presence of sulfuric acid as the catalyst. This ester had a B. P. at 760 mm. of 147° C. and an RI at 25° C. of 1.4030.

The unsaturated aldehydes that may be used in this process include acrolein, the alpha substituted acroleins, such as alpha methyl, alpha ethyl, alpha propyl, and the higher alpha alkyl substituted acroleins, as well as tiglaldehyde, furfuracrolein, metacrolein, cinnamaldehyde, and so forth. These aldehydes may be reacted under the conditions described herein with aliphatic monohydric alcohols generally, such, for example, as methanol, ethanol, N- and isopropanol, n- and isobutanol and the higher straight and branch chain aliphatic monohydric alcohols.

In addition to the catalyst described in the examples, other alkali metal and alkaline earth metal alkoxides may be employed or other basic catalysts and preferably those which are alcohol soluble. Any suitable polymerization inhibitor may be employed such, for example, as hydroquinone, pyrogallol, elemental sulfur or other well known polymerization inhibitors for the unsaturated aldehydes.

The reaction takes place spontaneously in the presence of basic catalyts and occurs at temperatures between −50 and +50° C. preferably between 0 and 15° C. The heat of reaction should be removed by suitable heat removing means in order to hold the temperature below 50° C. As the reaction occurs rapidly upon the addition of the acrolein to the alcohol it is recommended that the acrolein be dissolved in the alcohol to be reacted with it to give a solution containing from 25 to 75% of the aldehyde and this solution gradually added to the alcohol solution of the catalyst in order that the heat of reaction may be more readily dissipated and controlled. With efficient heat removing means the duration of the reaction may be considerably shortened by the use of higher temperature but at such temperatures by-product formation is increased.

While stoichometrically the reaction occurs between equimolar proportions of unsaturated aldehyde and alcohol, the alcohol should preferably be present in excess ranging from 1 to 10 moles of the alcohol per mole of the unsaturated aldehyde with preferred proportions ranging around 1 to 5 alcohol to unsaturated aldehyde.

The alkoxy-substituted aldehydes may be converted to corresponding acids which in turn may be converted to esters thereof by subjecting the aldehyde respectively to oxidation and esterification. Any suitable oxidation or esterfication process may be used for this purpose.

I claim:

1. A process for the preparation of beta-methoxy-isobutyraldehyde which comprises preparing a mixture of about 1.14 moles of alpha methacrolein, 1.87 moles of methanol and adding this mixture over a period of about 1 hour to a solution of about 5 moles of dry methanol containing 0.035% sodium methoxide, 0.018% hydroquinone and 1.8% water, the percentages being by weight, conducting the reaction at a temperature between 0 to 15° C., neutralizing the reaction product with sulfuric acid and recovering the beta-methoxy-isobutyraldehyde by distillation.

2. A process for preparing beta-methoxy isobutyraldehyde which comprises preparing a solution of alpha methacrolein in methanol containing from 25 to 75% by weight of the methacrolein, gradually adding this solution to substantially anhydrous methanol containing a sodium alkoxide catalyst, and a polymerization inhibitor maintained at a temperature between 0 and 15° C. and thereafter separating the beta-methoxy isobutyraldehyde after neutralization of the catalyst.

WILLIAM F. GRESHAM.

REFERENCES CITED

The following references are of record in the file of this patent:

UNITED STATES PATENTS

| Number | Name | Date |
|---|---|---|
| 2,288,211 | Schulz | June 30, 1942 |
| 2,402,133 | Gresham et al. | June 18, 1946 |

FOREIGN PATENTS

| Number | Country | Date |
|---|---|---|
| 489,330 | Great Britain | July 21, 1938 |
| 515,756 | Great Britain | Dec. 13, 1939 |